United States Patent [19]

Yamanishi

[11] Patent Number: 4,695,896
[45] Date of Patent: Sep. 22, 1987

[54] IMAGE FORMING APPARATUS
[75] Inventor: Eiichi Yamanishi, Kanagawa, Japan
[73] Assignee: Kabushiki Kaisha Toshiba, Kawasaki, Japan
[21] Appl. No.: 726,468
[22] Filed: Apr. 24, 1985
[30] Foreign Application Priority Data
May 30, 1984 [JP] Japan ................... 59-110263
[51] Int. Cl.⁴ .............................. H04N 1/23
[52] U.S. Cl. .................... 358/296; 358/300; 358/302; 346/76 PH; 355/4
[58] Field of Search .............. 355/4; 358/296, 300, 358/302; 346/76 PH; 250/317.1, 319

[56] References Cited

U.S. PATENT DOCUMENTS

4,469,433  9/1984  Kurata et al. .................... 355/4
4,586,834  5/1986  Hachisuga et al. ............ 346/76 PH
4,589,035  5/1986  Yamanishi et al. ................. 355/4 X Primary Examiner—L. T. Hix
Assistant Examiner—D. Rutledge
Attorney, Agent, or Firm—Cushman, Darby & Cushman

[57] ABSTRACT

An image forming apparatus capable of transferring a color pattern of an original onto a copying sheet in two modes: a nonlap print mode or a lap print mode. In a nonlap print mode using a two color original, color signals of light produced by reading the original pattern are converted into color signals of ink of the same colors as the original pattern. Then the original pattern is reproduced by using a transfer ink ribbon arranged the same colors as that of color signals of ink without lap transfer, that is, by transferring ink of one color on one PC cell of the copying sheet.

19 Claims, 18 Drawing Figures

IMAGE FORMING APPARATUS

BACKGROUND OF THE INVENTION

1. Field of the Invention

This invention relates to image forming devices such as, for example, copying machines, facsimile machines, document storage machines, printers etc. The invention includes both apparatus for and methods of image forming.

2. Description of the Prior Art

In a thermal transfer color copying machine, there is provided a thermal transfer ribbon having different color inks thereon such as, for example, yellow, magenta, cyanine, and black. When copying a colored original on such a copying machine, the imaged pattern of the original is analyzed by color into a pattern of the above four colors to express the color of the original on the copy by lapping each ink. However, in this method, even if the original is only two colors, such as for example red and blue, the reproduced color on the copy is formed by lapping the four colors of the ribbon. When the color is red, magenta ink and yellow ink are lapped. Therefore, when a copying paper for forming the duplicate is displaced during the two-color printing, there has been a defect that lapping of ink of the two colors is displaced, or spreading of ink becomes worse resulting in a bad poor quality image. When transferring an original where color letters are written on the background, for example the white background of a copying paper, there has been a disadvantage that the paper quality becomes remarkably worse.

SUMMARY OF THE INVENTION

The present invention provides an arrangement (apparatus and method) for dealing with problems of known color image forming apparatus. In the present invention, when the number of colors which composes the image of an original is for example two, the color signal of light from the original, which is read by an image information reading device is converted into a color signal of ink which is the same as the color of the original. The copy is printed using a thermal transfer ribbon using ink of the same color as that of the original. This permits the image of an original to be reproduced without performing lap transfer.

BRIEF DESCRIPTION OF THE DRAWINGS

These and other objects and advantages of this invention will become apparent and more readily appreciated from the following detailed description of the presently preferred exemplary embodiment particularly when read in conjunction with the accompanying drawings, wherein.

DETAILED DESCRIPTION OF THE PRESENTLY PREFERRED EXEMPLARY EMBODIMENTS OF THIS INVENTION

Figure 1:
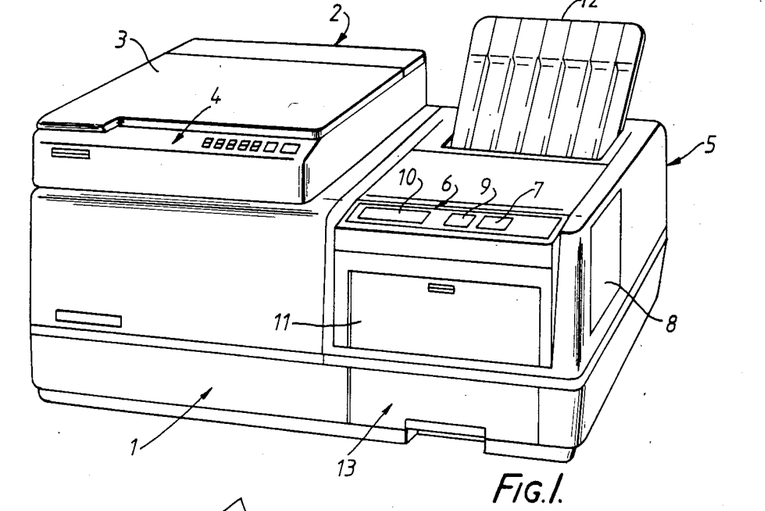
FIG. 1 is a perspective view of an exemplary embodiment of the image forming device of the present invention.

In FIG. 1, image information reading device 2 is mountably provided on the upper surface of main body 1. On device 2, original cover 3 is provided to be freely opened and closed. Under cover 3, there is provided an original plate (not shown in the drawing) composed of transparent glass where an original document (also referred to as an "original") is set. Image information reading device 2 optically scans the original set on the original plate when a scanner portion comprising exposure optical system moves forward and backward along the lower surface of the original plate and converts the optical information photoelectrically. Operation panel 4 is provided on the upper surface of device 2. The signal provided by device 2 is supplied to an image forming unit 5 mountably provided on the right side of main body 1, and in unit 5, an image corresponding to that signal is formed on a sheet of copying paper. On the upper front surface of image forming unit 5, operation panel 6 is provided. Operational panel 6 is provided with on-line scanner 7 for selecting image information reading device 2 connected to main body 1, eject key 9 for removing thermal transfer ribbon via door 8 provided on the side surface of unit 5, and display 10. Also, on the front surface of image forming unit 5, a guide 11 is provided for supplying copying paper manually. This guide 11 can be freely opened and closed. On the upper surface of the device, there is provided a receiving tray 12 where a copied paper is discharged. A paper cassette 13 can be freely installed and removed from main body 1. This cassette 13 is positioned under image forming part 5.

Figure 2:
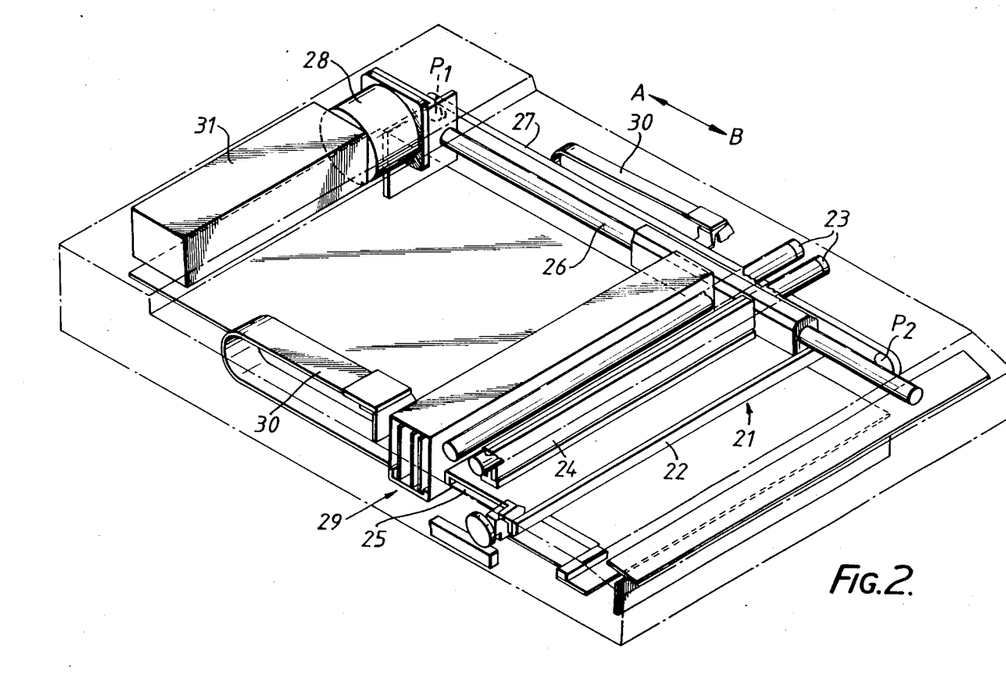
FIG. 2 is a perspective view showing the image information reading device.

Referring now to FIG. 2 there is shown a construction of image information reading device 2. On carriage 22 constituting a scanner part 21, two light sources 23 are provided in parallel and two lenses 24 are arranged in a reverse "V" configuration. Under the lower end of lenses 24, there is provided photoelectric converter 25 including a color charge coupled device (CCD). Carriage 22 is fitted to a guide shaft 26 slidably at one end and is mounted on a so-called timing belt (a toothed belt) 27 stretched along guide shaft 26. Timing belt 27 is driven by a pulse motor 28. That is, timing belt 27 is stretched between motor pulley $P_1$ provided on the rotary shaft of pulse motor 28 and idle pulley $P_2$. Scanner part 21 is moved according to movement of timing belt 27 in the directions of arrows A and B. An A/D converter 29 converts the output signal of photoelectric converter 25 into a digital signal. A flat cable 30 provides power from an inverter 31 to light sources 23 and supplies the output signal of A/D converter 29 to image forming unit 5.

Figure 3:
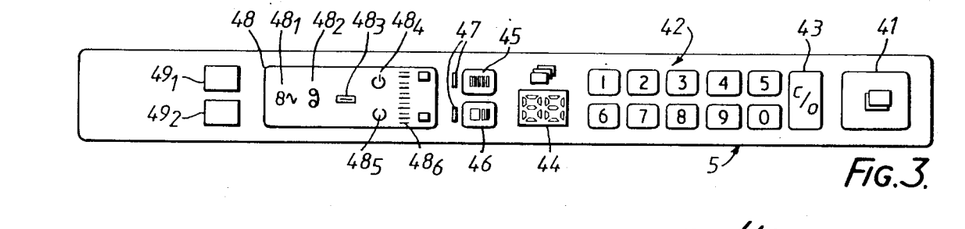
FIG. 3 is a plan view of the operation panel.

Referring now to FIG. 3 there is shown a more detailed view of operation panel 4. A print key 41 is used for initiating a printing operation. Digital keys 42 specify the number of prints to be made. Clear and stop key 43 clears a number of prints previously specified by manipulation of keys 43 and stops a printing operation in progress. Display 44 displays the number of prints etc. Key 45 is for specifying a half-tone mode corresponding to full-color and the density thereof, key 46 is for specifying a binary-mode corresponding to a single color or seven colors and the density thereof. Mode display 47 is for displaying a set mode of operation. Display 48 is for performing various displays. Print mode keys $49_1$ and $49_2$ are for changing over a two color print a multicolor lap print. Display 48 includes a jam display $48_1$ which lights when paper jamming occurs in main body 1, a ribbon display $48_2$ for displaying various conditions such as, for example, when no ribbon is present in a ribbon cassette mounted on main body 1 and when the cassette itself is not mounted on the main body, a paper display $48_3$ for displaying the mounting condition of paper cassette 8 and the existence of copying paper, scanner displays $48_4$ and $48_5$ for displaying the operation condition of scanner 11, and density display $48_6$ for displaying the density set by operation of mode keys 45 and 46.

Figure 4:
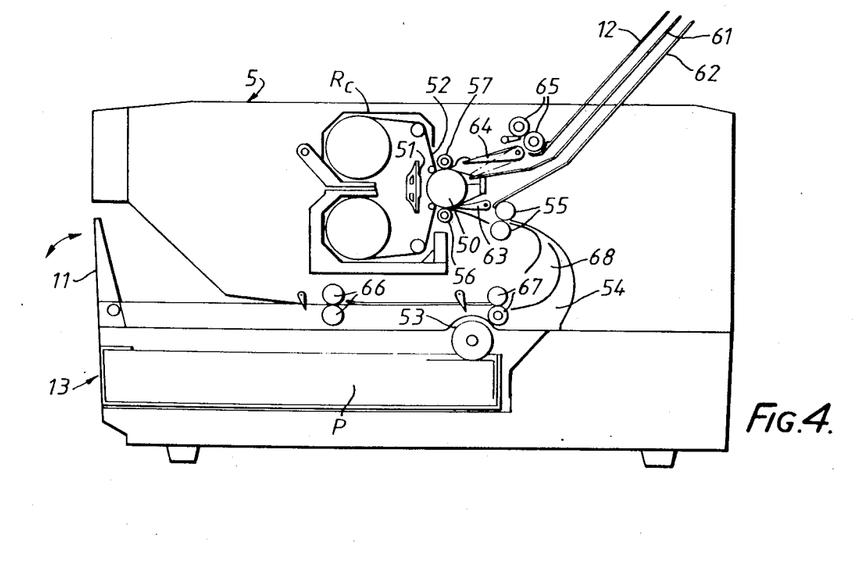
FIG. 4 is a sectional side view showing the configuration of the image forming unit.

Referring now to FIG. 4 there is shown a cross section of image forming unit 5. A platen 50 is provided at a central position of unit 5 and thermal head 51 is provided in contact with the platen 50.

Further, thermal head 51 is provided in the space of ribbon cassette Rc, and thermal transfer ribbon 52, used as an ink ribbon is interposed, between thermal head 51 and platen 50. With thermal transfer ribbon 52 interposed, copying paper P is pressed to platen 50 and a heating element (not shown in the drawing) formed in a line dot shape of thermal head 51 is heated according to image information to melt the ink on thermal transfer ribbon 52 and transfer on copying paper P.

A paper feed roller 53 is provided in a slant lower direction in main body 1 and copying paper P stored in paper cassette 13 is removed sheet by sheet. Paper P is guided to register rollers 55 provided in a slant upper direction of paper feed roller 53 through paper guide passage 54 and the position of the leading edge of paper P is arranged by register roller 55. Then, paper sheet P is transported to platen 50 and is pressed on the platen by pressure rollers 56 and 57 to be transported correctly.

Figure 5:
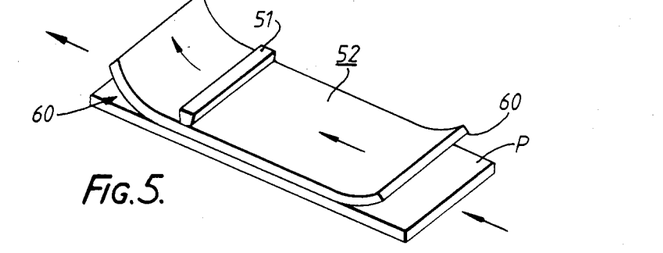
FIG. 5 is a perspective view of the thermal head, ribbon and copy sheet.

Thermal head 51 and platen 50 press the paper against thermal transfer ribbon 52. As shown in FIG. 5, ink 60 on thermal transfer ribbon 52 melts and flows to transfer to paper P. FIG. 5 shows a spot of ink 60 transferred to paper P.

Figure 6:
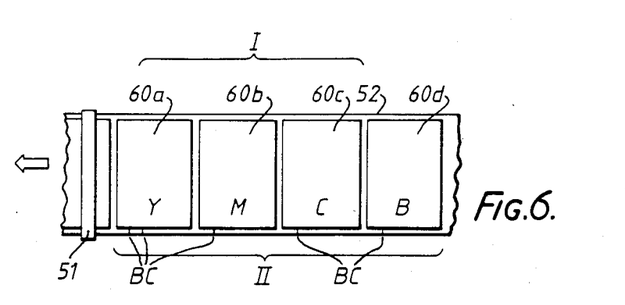
FIG. 6 is a plan view of the ink ribbon.
Figure 7A:
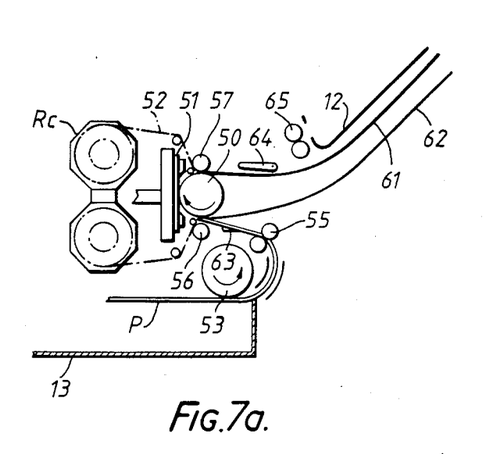
FIGS. 7(a), 7(b), 7(c) and 7(d) are the explanatory drawings explaining the movement of a copying paper for transferring multicolors.
Figure 7B:
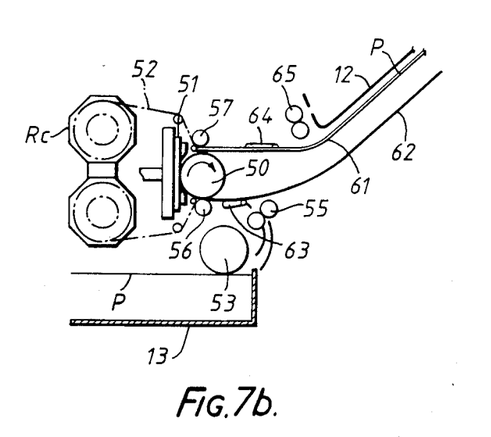
Figure 7C:
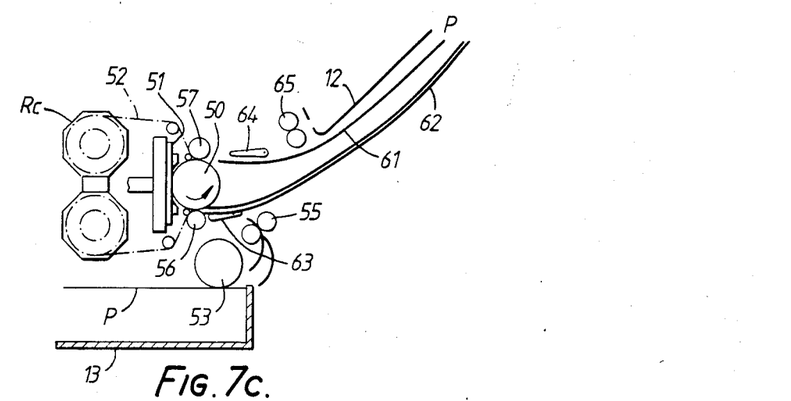
Figure 7D:
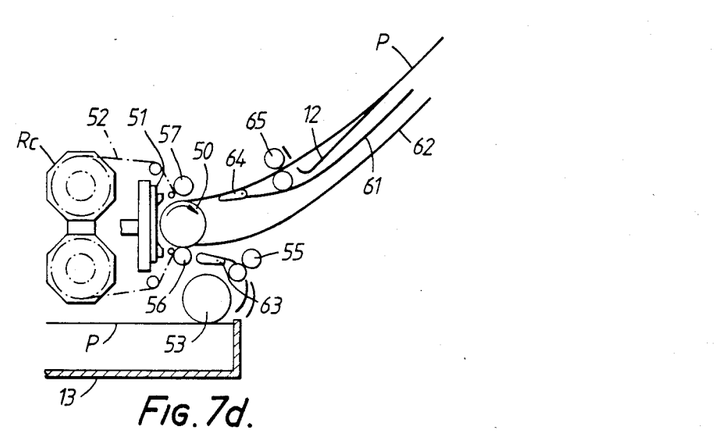

Also, on thermal transfer ribbon 52, as shown in the range I of FIG. 6, ink parts 60a, 60b and 60c of yellow (Y), magenta (M) and cyan (C), which are substantially equal to the size of paper P are arranged, or as shown in the range II, ink parts 60a, 60b, 60c and 60d of yellow (Y), magenta (M), cyan (C) and black (B) are arranged. After these colors are transferred one by one, the paper is returned to the original position to perform lap print correctly.

On the side periphery corresponding to ink parts 60a to 60d, bar codes BC are attached. Bar codes BC are necessary for discriminating ink parts 60a to 60d and for controlling so that the leading edges of ink parts 60a to 60d and the leading edge of the paper coincide. Bar code BC is read by a bar-code sensor to be described later.

When black ink part 60d is provided on thermal transfer ribbon 52, black ink part 60d is used for expressing black clearly. Even if black ink part is not provided, a color close to black can be obtained by lapping three colors.

In such a manner as described above, copying paper P is reciprocated by the number of colors by rotation of platen 50. Then, copying paper P is guided onto first guide 61 and second guide 62 provided in order along the lower surface of receiving tray 12.

Referring now to FIGS. 7(a) to 7(d), an explanation will be given regarding the passage of copying paper P. Copying paper P supplied from paper cassette 13 begins to wind around platen 50 through register rollers 55 and first sorting gate 63. (Refer to FIG. 7(a).)

Then, platen 50 is rotated by pulse motor 28 (shown in FIG. 2) as a driving source and transmits paper P at a fixed speed, thermal element (not shown in the drawing) of thermal head 51 formed in line-dot shape along the axial direction of platen 50 is heated according to image information, and ink 60 of thermal transfer ribbon 52 is transferred on paper P.

The leading edge of paper P, having passed platen 50 is guided by a first guide 61 provided along the lower surface of receiving tray 12 and by second sorting gate 64. (Refer to FIG. 7(b)).

In such a manner as described above, paper P where ink 60 of one color is transferred is sent in the reverse direction by reverse rotation of platen 50 and then is sent onto second guide 62 provided along the lower surface of first guide 61 by rotary displacement operation of first sorting gate 63. (Refer to FIG. 7(c).)

Thus, multicolor copy is performed by reciprocating copying paper P several times.

Paper P, having ink 60 of all colors deposited thereon, is guided to discharge rollers 65 by second sorting gate 64 and is exhausted on receiving tray 12. (Refer to FIG. 7(d).)

Rollers 66 and 67 (shown in FIG. 4) are used for transporting the paper fed manually and the paper transported by rollers 66 and 67 is led to register rollers 55 through the guide passage 68.

Figure 8:
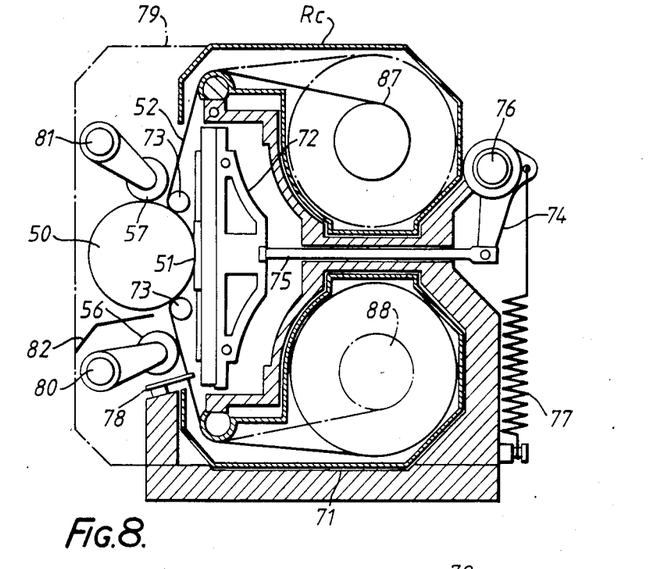
FIG. 8 is a sectional side view of the essential parts of the image forming unit.
Figure 9:
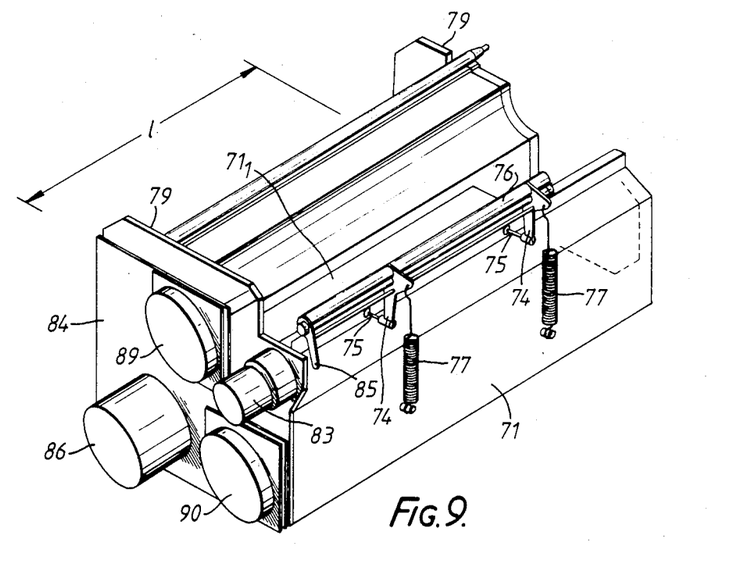
FIG. 9 is a perspective view of the parts shown in FIG. 8.
Figure 10:
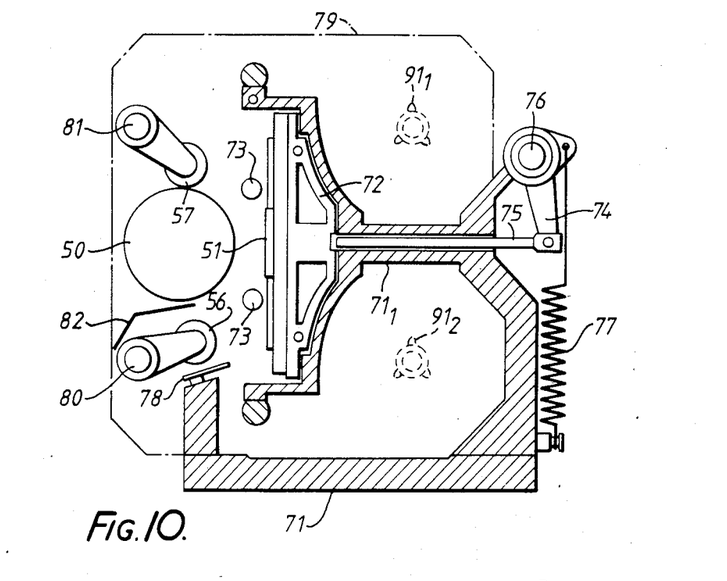
FIG. 10 is a sectional side view showing the device when the ribbon cassette is removed from the FIG. 8 arrangement.

The following explains the construction of image forming unit 5. In FIGS. 8 to 10, printer block 71 has a shape that is substantially the same as the external shape of ribbon cassette Rc. On block 71, there are provided head holder 72 which supports thermal head 51 at the rear thereof and which functions as a radiator plate. There are also provided a member 73 mounted in one body with head holder 72, rod 75 mounted on head holder 72 at one end connected to driving ink 74 at the other end, rotating shaft 76 to links 74. Coiled springs 77 rotate and energize links 74 in one direction and move thermal head 51 in the direction of platen 50 through rods 75. A bar-code sensor 78 comprising a light-emitting element and light-receiving element is provided for detecting the bar-code attached to thermal transfer ink ribbon 52.

Platen 50 is mounted on a frame 79 attached on both sides of printer block 71, and support shafts 80 and 81 of pressure rollers 56 and 57 for pressing the paper on platen 50 are provided on frame 79. Pressure rollers 56 and 57 are driven by a solenoid not shown in the drawing. Also, paper guide 82 is provided between pressure roller 56 and platen 50. As shown in FIG. 9, there is provided on frame 79, a motor 83 for driving thermal head 51 and a motor frame 84. On the rotating shaft (not shown in the drawing) of motor 83, a cam is provided. By this cam, lever 85 is rotated and thermal head 51 is pushed against the energizing force of coiled springs 77. Also, on motor frame 84, platen driving motor 86 and ribbon driving motors 89 and 90 for driving the winding cores (shown in FIG. 8) for thermal transfer ink ribbon 52 stored in ribbon cassette Rc are provided. Motors 86, 89 and 90 drive platen 50 and winding cores 87 and 88 through gears not shown in the drawing. Among these gears, at the center of rotation of the gears for driving winding cores 87 and 88, engaging projections $91_1$ and $91_2$ are provided as shown in FIG. 9. By controlling motors 89 and 90, thermal transfer ribbon 52 can run in both forward and backward directions.

Figure 11:
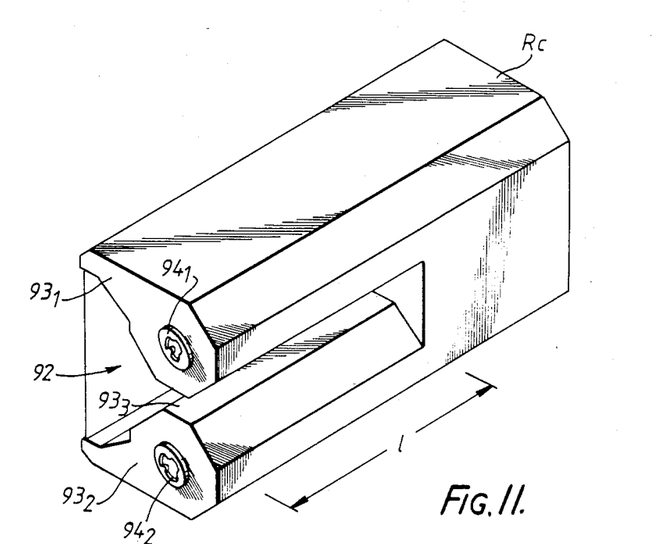
FIG. 11 is a perspective view of the ribbon cassette.

Ribbon cassette Rc is mountable to printer block 71. That is, as shown in FIG. 11, the section of ribbon cassette Rc is formed in substantially U-shape to form space 92 for storing holder 72, member 73, and thermal head 51 between the rear surface of the exposure part of thermal transfer ribbon 52 and ribbon cassette Rc. Also, on ribbon cassette Rc, slit $93_3$ to be fitted with fitting part $71_1$ (shown in FIGS. 9 and 10) of printer block 71 is formed along the lengthwise direction between winding core storing portions $93_1$ and $93_2$. The length of strip $93_3$ and that of fitting part $71_1$ are substantially equal and the length is set to more than the half of the width of thermal transfer ribbon 52. Therefore, by moving ribbon cassette Rc lengthwise to printer block 71, it is possible to mount ribbon cassette Rc on printer block 71 or remove it from printer block 71. Further, on the side surface of winding core storing portions $93_1$ and $93_2$, engaging recessed portions $94_1$ and $94_2$ are engaged with engaging projections $91_1$ and $92_2$ in a status where ribbon cassette Rc is mounted on printer block 71. When driving ribbon cassette Rc is mounted on printer block $71_1$, thermal transfer ribbon 52 contacts platen 50 by member 73 as shown in FIG. 8. The copying paper is interposed between platen 50 and thermal transfer ribbon 52. When thermal head 51 is heated according to image information, the ink of thermal transfer ribbon 52 is melted by heat and is transferred on the copying paper.

Figure 12:
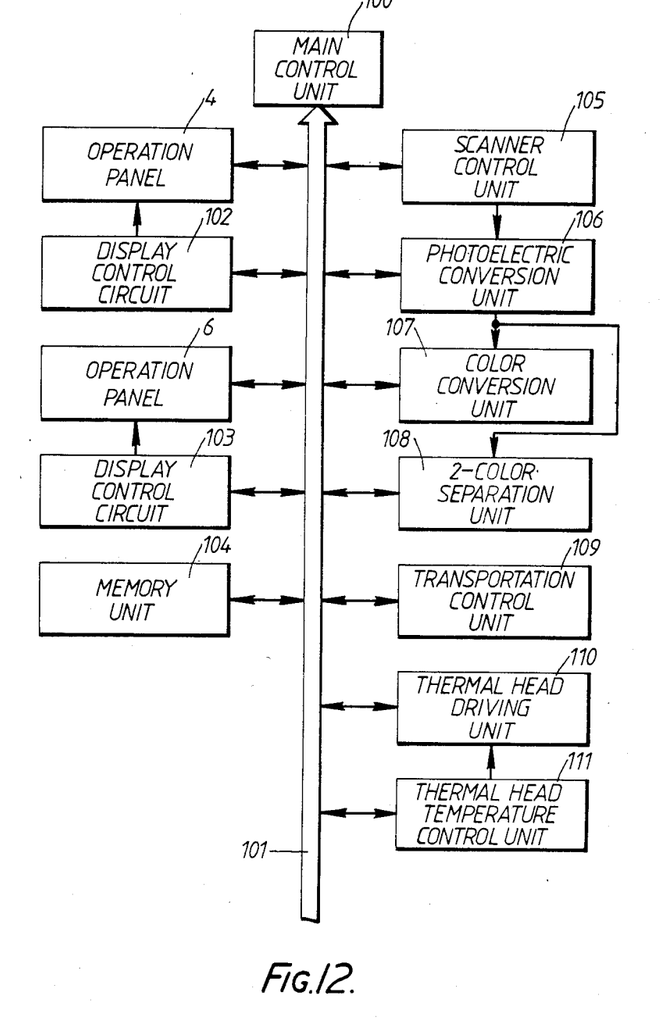
FIG. 12 is a block diagram of the control system.

In FIG. 12 there is shown a schematic illustration of the whole control system, main control unit 100 includes a central processing unit and circuits peripheral thereto, and a bus line 101 connected thereto. To bus line 101 are connected: operation panel 4 of image information reading device 2, operation panel 6 of image forming unit 5 and display control circuits 102 and 103 for controlling panels 4 and 6. Also connected to bus 101 are: memory unit 104, scanner control unit 105, photoelectric conversion unit 106, color conversion unit 107, 2-color separation unit 108, transportation control unit 109 thermal head drive unit 110 and thermal head temperature control unit 111. Display control circuits 102 and 103 are operated according to a signal to be sent from main control unit 100 through bus line 101, and control displays 48 and 10. The signals related to the key operated in operation panels 4 and 6 are supplied to main control unit 100 through bus line 101, and control corresponding to these signals is performed. Memory unit 104 is operated according to the signals sent from main control unit 100 through bus line 101, and stores information to be sent through bus line 101 or reads the stored information.

Scanner control part 105 is operated according to the signals sent from main control unit 100 through bus line 101, and controls light source 23 of scanner unit 21, pulse motor 28 and photoelectric conversion unit 106 respectively. Photoelectric conversion unit 106 detects the images on the original according to the signals sent from main control unit 100 and outputs the digitalized color signals of light. Color conversion unit 107 converts the color signals of light, which are output from photoelectric conversion unit 106, into color signals of each ink of yellow, magenta, cyanine and black, and outputs these color signals to bus line 101. 2-color separation unit 108 converts the color signals of light, which are output from photoelectric conversion unit 106, into color signals of ink, for example, of black and red, and is used when the image of original is composed of two colors such as black and red. The output signal of 2-color separation unit 108 is output in bus line 101. Also, 2-color separation unit 108 and color conversion unit 107 perform color conversion to the signals sent from bus line 101, and can output new signals to bus line 101.

Transportation control unit 109 is operated according to the signals sent from main control unit 100 through bus line 101. Unit 109 drives motor 86 for driving platen 50, motors 89 and 90 for driving winding cores 87 and 88 of ribbon cassette Rc, the motors for driving paper feed roller 53, register rollers 55, discharges rollers 65, and the solenoids for driving first sorting gate 63 and second sorting gate 64. Thermal head driving unit 110 is operated according to the signals sent from main control unit 100 through bus line 101 and the signals sent from thermal head temperature control unit 111, and drives to control the thermal element of thermal head 51. Thermal head temperature control unit 111 outputs temperature control signals to thermal head driving unit 110 according to the signals sent from main control unit 100 through bus line 101.

Figure 13:
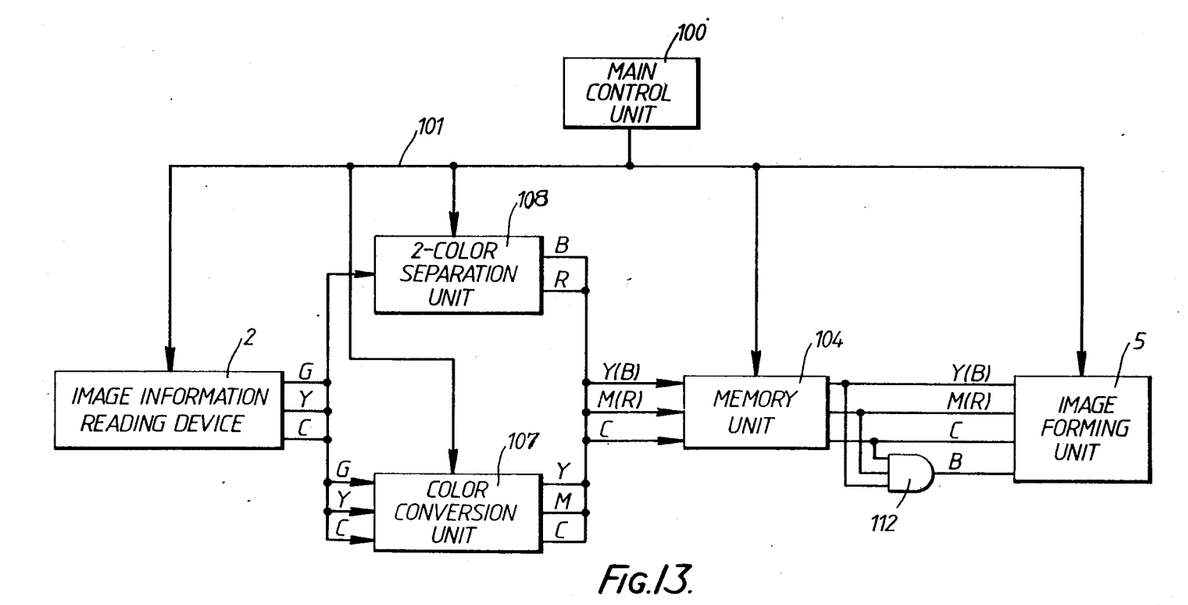
FIG. 13 is a more detailed block diagram of a portion of FIG. 12.

In FIG. 13, the color signals of light of green (G), yellow (Y) and cyan (C), which are output from photoelectric conversion unit 106 of image information reading device 2, are supplied to color conversion unit 107 or 2-color separation unit 108. Selection of unit 107 and unit 108 is performed by operating any of print mode keys $49_1$ and $49_2$ provided on operation panel 4. That is, when the image of an original is composed of two colors of black and red, print mode key $49_1$ may be operated for selecting 2-color separation unit 108. When the image is composed of multicolors, print mode key $49_2$ may be operated for selecting color conversion unit 107. In color conversion unit 107, the color signals of light green, yellow and cyanine are converted into color signals of ink of yellow, magenta and cyanine which are in relation of complementary colors by using, for example, a conversion table.

Figure 14:
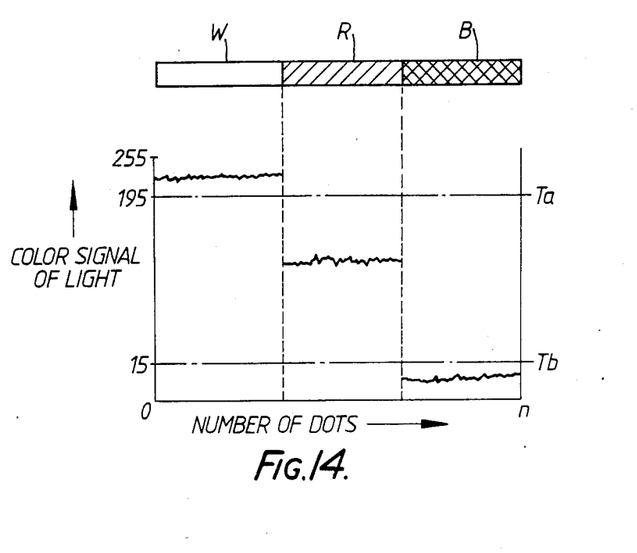
FIG. 14 is a drawing for explaining the separation to two colors.

In 2-color separation unit 108, the color signals of light are converted into color signals of black (B) and red (R) as follows. When an original is a 2-color original where black and red are used on a white ground, the output data (for example, $(G+Y+C)/3$) of photoelectric conversion unit 106 is that shown in FIG. 14. In FIG. 14, the color signal of light is converted into a 8-bit data and white (W), red (R) and black (B) are shown by a data at different levels respectively. Accordingly, by comparing the data with fixed threshold values Ta (digital values "195") and Tb (digital values "15"), separation of colors can be performed. That is, if the data of each image element, which is output from photoelectric conversion unit 106, is as C, the separation of two colors can be performed by judging as white when $C > Ta$
red when $Ta > C > Tb$
black when $C < Tb$ Output data B and R of 2-color separation unit 107 or output data Y, M and C of color conversion unit 106 are stored in memory unit 104 by every color together with the position information of the original. In image forming unit 5, the transfer is performed according to the data read from memory unit 104. That is, for transfer of multicolors, the ink of the thermal transfer ribbon is lap transferred successively by data Y, M and C read from memory unit 104 and data B obtained by processing these data through AND circuit 112. In this case, on image forming unit 5, a ribbon cassette where yellow, magenta, cyanine and black ink are arranged is mounted.

Figure 15A:
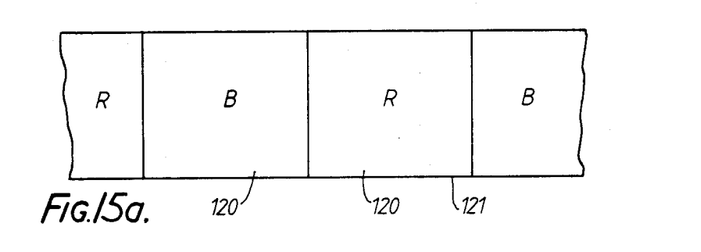
FIG. 15 is a plan view showing the arrangement of ink of the thermal transfer ribbon.

For transfer of two colors, the transfer is performed by data B and R read from memory unit 104. In this case, on image forming unit 5, as shown in FIG. 15(a), thermal transfer ribbon 121 where black and red ink 120 are arranged in order is mounted, and the image of original is reproduced by black and red ink 120 without performing lap transfer.

According to above embodiment, formation of an image is performed by providing color conversion unit 107 and 2-color separation unit 108, selecting 2-color separation unit 108 when the image of the original is composed of two colors, and mounting a ribbon cassette for ink of two colors composing the image of the original. Therefore, colors can be transferred by the thermal transfer ribbon conformed to the number of the colors of the original and unused ink can be eliminated, and is advantageous economically.

In addition, since transfer is performed by the ink of the same color as the original, it is unnecessary to perform lapping of ink. There, displacement of colors scarcely occurs and especially, a clear image can be obtained when the original is of letters. Further, since lap transfer is not performed, sticking of ink is excellent.

Figure 15B:
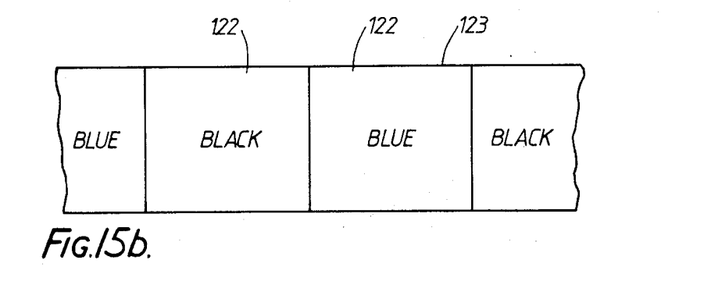

In above embodiment, the data corresponding to black and red is produced in 2-color separation unit 108. However a data of black and blue, for example, can be produced by changing the threshold values Ta and Tb of 2-color separation unit 108. Accordingly, as shown in FIG. 15(b), when using the thermal transfer ribbon 123 composed of black and blue ink 122, the original composed of black and blue can be reproduced.

Also, when changing the threshold value or setting a threshold of more than two, it is possible to perform color separation of a 2-color original or a 3-color original and when preparing a thermal transfer ribbon composed of a combination of ink for above separation, color-separated originals can be reproduced.

Further, in a second embodiment selection of a 2-color separation unit 108 and color conversion unit 107 can be performed by providing code information showing the kind of the stored thermal transfer ribbon on the outer surface of a ribbon cassette, reading the code information with the ribbon cassette mounted on image forming unit 5, and selecting automatically 2-color separation unit 108 and color conversion unit 107 according to the code information.

Although only several preferred embodiments have been described in detail above, those skilled in the art will readily appreciate that many modifications are possible in the preferred embodiments without materially departing from the novel techniques and advantages of this invention. Accordingly, all such modifications are intended to be covered by this invention as described in the following claims.

What is claimed is:

1. An image forming apparatus for transferring a color pattern of an original onto a copying sheet, comprising:
   reading means for reading a color pattern of said original;
   conversion means for converting the color pattern read by said reading means into a color signal indicative thereof;
   transfer means for transfering on said copying sheet according to said color signal, said transfer means including a plurality of colors;
   means for selectively commanding one of a 2-color nonlap print mode and a lap print mode; and
   image forming means for selecting one color of said plurality of colors of the transfer means according to said color signal for one picture element of said copying sheet when said commanding means commands a two color nonlap print mode, and for transferring only said one color onto said picture element of said copying sheet.

2. An image forming apparatus according to claim 1, wherein said conversion means is also for converting said color signal of light into a color signal of a same color as that composing said image of said original when the same color agent with the converted color signal is arranged on said transfer material.

3. An image forming apparatus according to claim 1, wherein said conversion means comprises first means for transferring said color signal into a color signal of a same color as that composing the image of said original, and second means for transferring said color signal of a complementary color to a color composing the image of said original, said first and second means being selectable according to the image of said original.

4. An image forming apparatus according to claim 1, wherein said conversion means converts two color signals of light of the image of said original into color signals of color agents of two colors.

5. An image forming apparatus according to claim 1, wherein said transfer material comprises several kinds of materials which are different in combination of color agents.

6. Apparatus as in claim 1 further comprising two color separation means, for processing areas of said color pattern in a nonlap print mode, to determine said one color.

7. An apparatus as in claim 6 wherein said commanding means includes a plurality of print keys.

8. An apparatus as in claim 6 wherein said commanding means is a code printed on said transfer means.

9. An image forming apparatus for transferring a pattern of a multicolored original onto a copying material by using transfer material, comprising;
   first means for inputting an imaging pattern signal indicative of said original and for transferring said pattern onto said copying material;
   second means for indicating one of a plurality of color transfer modes, including a 2-color transfer mode; and
   third means for processing said imaging pattern signal and outputting a controlling signal to said first means so as not to lap transfer said transfer material to any picture element of said copying material when said 2-color transfer mode is chosen.

10. An apparatus as in claim 9, wherein said third means includes two color separation means, for processing said image pattern signal to determine a color in said transfer material, and color conversion means, for determining colors of transfer material to be lap printed in a lap printing mode.

11. An apparatus as in claim 10 wherein said second means includes a plurality of print keys.

12. An apparatus as in claim 10 wherein said first means includes a ribbon cassette, and said second means includes code containing means, coupled to said ribbon cassette.

13. A method of image forming a pattern of an original on a copying material by using transfer material arranged color agent, said method comprising the steps of:
   reading the image of said original and producing a reading signal;
   converting said reading signal into a color signal of said color agent;
   determining a color transfer mode from a plurality of modes, one of said modes being a 2-color print mode; and
   forming said pattern of said original on said copying material by one of lap transfer and single transfer of said transfer material, only a single transfer being used in said 2-color print mode.

14. A method of image forming according to claim 13 wherein said converting step includes converting said reading signal into a color signal of the same color as that composing said image of said original when arranging said color agent of the same color with that of said color signal on said transfer materials.

15. A method of image forming according to claim 13, wherein said converting step comprises converting said reading signal into a color signal of the same color with that composing said image of said original, and converting said reading signal into a color signal of a complementary color to a color composing the image of said original.

16. A method of image forming according to claim 15, wherein said method further comprising the step of selecting one of said converting steps according to the kind of colors on said original.

17. A method of image forming according to claim 13, wherein said converting step includes converting two color signals of light of image of said original into color signals of color agents of two colors.

18. A method of image forming a pattern of an original onto a copying material by using transfer material arranged color agent, said method comprising the steps of:
   determining one of a 2-color print mode, and a multi-color print mode;
   inputting imaging pattern signals indicative of said original;
   processing said inputting signals so as not to lap transfer said transfer material to said copying material; and
   transferring said color agent to said copying material corresponding to said processing signals.

19. An image forming apparatus for transferring a pattern of a multicolored original onto a copying material, by using transfer material, comprising:
   means for detecting said pattern of said original, and producing a color signal indicative thereof;
   two color separation means, for selectively converting said color signal into individual color signals of ink to be printed without lap-printing;
   color conversion means for selectively converting said color signal into ink colors to be printed by lap-printing; and
   means for commanding one of said two color separation means and said color transfer means.

* * * * *